Patented Apr. 14, 1936

2,037,448

UNITED STATES PATENT OFFICE 2,037,448

MANUFACTURE OF THIOFLAVINE T

Otto Allemann, Wilmington, Del., assignor to E. I. du Pont de Nemours & Company, Wilmington, Del., a corporation of Delaware No Drawing. Application April 5, 1935, Serial No. 14,820

5 Claims. (Cl. 260—44)

This invention relates to the manufacture of the dyestuff known under the trade name of Thioflavine T (Colour Index No. 815).

It is an object of this invention to provide an improved process for the manufacture of this dyestuff from relatively inexpensive initial material and by the aid of relatively common apparatus. Other and further important objects of this invention will appear as the description proceeds.

Thioflavine T is the chloromethyl derivative of dimethyl-dehydrothio-p-toluidine and is manufactured by methylating dehydrothio-p-toluidine. The methylation is generally effected by reacting dehydrothio-p-toluidine with methyl alcohol under pressure in the presence of hydrochloric or sulfuric acid. (See U. S. Patent No. 412,978.) When hydrochloric acid is employed the reaction must be carried out in an enamelled autoclave, which is rather expensive. When sulfuric acid is employed, a lead-lined autoclave may be used, but the yield of dyestuff by this method is considerably lower than in the first case.

I have now found that the yield of Thioflavine T by the sulfuric acid method can be greatly improved by adding to the reaction mass a small amount of an alkyl or aralkyl bromide or of a soluble inorganic bromide. The conversion of dehydrothio-p-toluidine to Thioflavine T by this new method is at least as high as with the methyl-alcohol-hydrochloric acid method and this process has the advantage that it can be carried out in a lead-lined autoclave.

The methylation is then followed by the customary steps of solution, neutralization, filtration of insoluble material, if any, and acidification by the aid of hydrochloric acid, to introduce the requisite Cl atoms. The formula of the product is believed to correspond to the following:

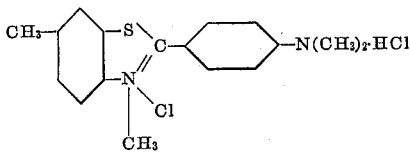

Without limiting my invention to any particular procedure, the following examples are given to illustrate my preferred mode of operation. Parts are by weight:

Example I

| | |
|---|---|
| Parts of dehydro-thio-p-toluidine (distilled) | 120 |
| Parts of methyl alcohol | 320 |
| Parts of sulfuric acid (96%) | 46 |
| Parts of ethyl bromide | 14 | are charged into a lead-lined autoclave and heated to 150° C. for 8 hours. A pressure of approximately 600 lbs. usually develops. The contents of the autoclave are then dissolved in 2200 parts of water at 60 to 65° C. To this solution sodium carbonate (approximately 20 parts) is slowly added until it is distinctly alkaline to Brilliant yellow paper. Some insoluble matter is removed by filtration and the clear color solution is acidified with 50 grams of hydrochloric acid (37%). The dye is salted out at 65° C. and after cooling to room temperature is filtered, blown with air as dry as possible, and dried at 60 to 70° C. The yield is over 90%.

Example II

| | |
|---|---|
| Parts of dehydrothio-p-toluidine (distilled) | 120 |
| Parts of methyl alcohol | 320 |
| Parts of sulfuric acid (96%) | 53 |
| Parts of sodium bromide | 13 | are heated in a lead-lined autoclave to 150° C. for 8 hours. The charge is worked up as described in Example I. The yield is approximately the same.

The insoluble matter which is recovered represents partly-methylated dehydrothio-p-toluidine and may be used again in subsequent methylations.

Instead of sodium bromide and ethyl bromide mentioned in the above examples, any other inorganic bromide or alkyl or aralkyl bromide may be used, for instance, the bromides of potassium, lithium, magnesium, manganese, zinc, iron, etc. In general, any bromide, inorganic or organic which is adapted to liberate under the working conditions free hydrobromic acid may be used. Free hydrobromic acid may likewise be employed. Bromides which would give insoluble precipitates with sulfuric acid should preferably be avoided.

The quantity of bromide employed need only be catalytic. Consequently, it may vary within wide limits, say from 0.05 to 0.5 mole per mole of dehydrothio-p-toluidine. Likewise can the proportions of sulfuric acid and methyl alcohol, as well as the temperature and time in the autoclave, be varied within wide limits as is customary in this art.

In lieu of dehydrothio-p-toluidine, one may use the crude mixture obtained in the Primuline melt, the resulting by-product dimethyl-primuline base being separated from the Thioflavine T by extraction of the latter with boiling water, as is customary in this art. (See, for instance, Colour Index under No. 815.)

Many other variations and modifications, falling within the skill of the person acquainted with this art, may be practised with my invention without departing from the spirit thereof.

It will be seen now that my invention combines the high yield of the hydrochloric acid method with the simplicity and economy of the sulfuric acid method, enabling the reaction to be carried out in lead-lined apparatus.

I claim:

1. In the process of producing Thioflavine T by reacting dehydrothio-p-toluidine with methyl alcohol and sulfuric acid, the improvement which comprises effecting said reaction in the presence of bromide ions.

2. In the process of producing Thioflavine T by reacting dehydrothio-p-toluidine with methyl alcohol and sulfuric acid, the improvement which comprises effecting said reaction in the presence of a bromide compound adapted to react with sulfuric acid to form hydrobromic acid.

3. In the process of producing Thioflavine T by reacting dehydrothio-p-toluidine with methyl alcohol and sulfuric acid, the improvement which comprises effecting said reaction in the presence of an alkyl bromide.

4. In the process of producing Thioflavine T by reacting dehydrothio-p-toluidine with methyl alcohol and sulfuric acid, the improvement which comprises effecting said reaction in the presence of hydrobromic acid.

5. In the process of producing Thioflavine T by reacting dehydrothio-p-toluidine with methyl alcohol and sulfuric acid, the improvement which comprises effecting said reaction in a lead-lined autoclave in the presence of a compound adapted to react with sulfuric acid to form hydrobromic acid.

OTTO ALLEMANN.